(12) United States Patent
Al-Anazi et al.

(10) Patent No.: US 11,401,787 B2
(45) Date of Patent: Aug. 2, 2022

(54) SYSTEMS AND METHODS TO CHEMICALLY LIVEN DEAD WELLS

(71) Applicant: Saudi Arabian Oil Company, Dhahran (SA)

(72) Inventors: Ammal Al-Anazi, Ras Tanura (SA); James Ohioma Arukhe, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 66 days.

(21) Appl. No.: 17/010,545

(22) Filed: Sep. 2, 2020

(65) Prior Publication Data

US 2022/0065082 A1 Mar. 3, 2022

(51) Int. Cl.
*E21B 43/12* (2006.01)
*E21B 47/008* (2012.01)
(Continued)

(52) U.S. Cl.
CPC ............ *E21B 43/121* (2013.01); *E21B 36/04* (2013.01); *E21B 37/06* (2013.01); *E21B 41/00* (2013.01);
(Continued)

(58) Field of Classification Search
CPC ...... E21B 43/128; E21B 47/008; E21B 37/06; E21B 41/00; E21B 43/121; E21B 26/005;
(Continued)

(56) References Cited

U.S. PATENT DOCUMENTS 3,016,833 A * 1/1962 Creed .................... F04B 47/00
417/85
3,863,717 A 2/1975 Cooper
(Continued)

FOREIGN PATENT DOCUMENTS

CN 202990995 U 6/2013
CN 203669848 U 6/2014
(Continued)

OTHER PUBLICATIONS

International Search Report and the Written Opinion of the International Authority, dated Jan. 3, 2022, in the prosecution of patent application PCT/US2021/0458622, 14 pages.

*Primary Examiner* — Nicole Coy
(74) *Attorney, Agent, or Firm* — Bracewell LLP; Constance G. Rhebergen; Eleanor L. Tyson

(57) ABSTRACT

A well livening system to reduce an accumulation in a wellbore includes a chemical skid, the chemical skid includes a chemical storage tank configured to contain the dosing chemical, a dosing pump configured to transfer an amount of the dosing chemical from the chemical storage tank to a wellbore, a skid line, and a dosing check valve configured to allow flow of the amount of dosing chemical, a controller system configured to determine the amount of dosing chemical to be transferred to the wellbore based on downhole data, the connection line configured to transport the amount of dosing chemical from the chemical skid, an injection spool, a hanger configured to support the chemical injection string and to isolate the wellbore from the surface, the chemical injection string configured to deliver the amount of dosing chemical to the wellbore, and a data acquisition system configured to collect downhole data.

8 Claims, 7 Drawing Sheets

(51) Int. Cl.
*E21B 37/06* (2006.01)
*E21B 41/00* (2006.01)
*E21B 36/04* (2006.01)
*E21B 43/24* (2006.01)
*F04B 47/06* (2006.01)
*F04B 49/03* (2006.01)
*C09K 8/592* (2006.01)

(52) U.S. Cl.
CPC ........ *E21B 43/128* (2013.01); *E21B 43/2401* (2013.01); *E21B 47/008* (2020.05); *F04B 47/06* (2013.01); *F04B 49/03* (2013.01); *C09K 8/592* (2013.01)

(58) Field of Classification Search
CPC ...... E21B 36/04; E21B 43/24; E21B 43/2401; F04B 47/06; F04B 49/03; C09K 8/492
See application file for complete search history.

(56) References Cited

U.S. PATENT DOCUMENTS

| | | | |
|---|---|---|---|
| 6,832,653 | B1 | 12/2004 | Hayhurst et al. |
| 8,408,314 | B2* | 4/2013 | Patel ................. E21B 37/06 |
| | | | 166/373 |
| 8,766,146 | B2* | 7/2014 | Diehl ................. H05B 6/105 |
| | | | 219/600 |
| 9,062,518 | B2* | 6/2015 | Patel ................. E21B 41/02 |
| 9,429,678 | B2* | 8/2016 | Abitrabi ............. G01V 13/00 |
| 9,463,424 | B2 | 10/2016 | Kanstad et al. |
| 10,316,640 | B2* | 6/2019 | Fox ................... E21B 34/16 |
| 10,480,299 | B2 | 11/2019 | Xiao et al. |
| 2006/0096760 | A1 | 5/2006 | Ohmer |
| 2008/0121391 | A1* | 5/2008 | Durham .............. E21B 43/121 |
| | | | 166/250.15 |
| 2011/0024130 | A1 | 2/2011 | Barry |
| 2018/0045027 | A1 | 2/2018 | Haley et al. |
| 2018/0238153 | A1* | 8/2018 | Nevison ............. E21B 43/166 |
| 2019/0211657 | A1* | 7/2019 | Porto ................ E21B 43/162 |
| 2020/0371084 | A1* | 11/2020 | Havenga ............. E21B 44/00 |

FOREIGN PATENT DOCUMENTS

| | | |
|---|---|---|
| JP | 3567435 B2 | 9/2004 |
| JP | 2006130419 A | 5/2006 |

\* cited by examiner

SYSTEMS AND METHODS TO CHEMICALLY LIVEN DEAD WELLS

BACKGROUND OF THE INVENTION

Technical Field

Disclosed are systems and methods for restoring flow in wells with accumulation of heavy waxy, heavy gradient oil materials by diluting, breaking down, or reducing the fluid's hydrostatic pressure gradients in an oil well. More specifically, disclosed are systems and methods for reducing the hydrostatic pressure gradients of these precipitations in a low-pressure oil reservoir by chemically diluting and/or thermally reducing the viscosity of the materials causing the high-pressure gradients. Lightening the pressure head of the heavy gradient fluid through chemical or thermal dilution will improve the well's vertical lift performance. Consequent upon the treatment, the well can flow against the trunk line pressure as the reservoir pressure becomes sufficient to drive the formation fluids through the tubing and to the surface.

Description of the Related Art

In wells with low reservoir pressures, production can slow or cease all together due to build-up of materials or due to gradients that develop in the produced fluid. Both build-up and gradients cause blockages in the wellbore or tubular which prevents the formation fluids from flowing from the producing zone to the surface. The treatment solution can depend on the type of block and different treatments may be needed for the same well to address different types of blockages. Treatment methods can include dropping soap sticks, swabbing, use of capillary strings, deliquefication, corrosion inhibition, scale inhibition and acid treatment procedures. All of these methods suffer for not being controllable, resulting in under diluted wells or over diluted wells. As a result, well operators often over apply the treatment method to ensure it will be successful, which can result in well operators are left to hope that the treatment will be successful, without any insight into the process within the wellbore. Often these treatment methods require multiple applications before the well begins producing again.

SUMMARY

Disclosed are systems and methods for reducing hydrostatic pressure gradients in an oil reservoir. More specifically, disclosed are systems and methods for reducing hydrostatic pressure gradients in a low pressure oil reservoir by diluting and breaking the high pressure gradients.

In a first aspect, a well livening system to reduce an accumulation in a wellbore is provided. The system includes a chemical skid, the chemical skid located at a surface adjacent to the wellbore. The chemical skid includes a chemical storage tank, the chemical storage tank configured to contain the dosing chemical, a dosing pump, the dosing pump fluidly connected to the chemical storage tank, the dosing pump configured to transfer an amount of the dosing chemical from the chemical storage tank to a wellbore, a skid line, the skid line fluidly connecting the chemical storage tank, the dosing pump and a connection line, and a dosing check valve positioned on the skid line, the dosing check valve configured to allow flow of the amount of the dosing chemical. The system further includes a controller system, the controller system configured to determine the amount of the dosing chemical to be transferred to the wellbore based on downhole data, the controller system electrically connected to the dosing check valve such that the controller system sends signals to open and close the dosing check valve based on the amount of the dosing chemical, the connection line, the connection line fluidly connected to the dosing check valve of the chemical skid, the connection line configured to transport the amount of the dosing chemical from the chemical skid, an injection spool, the injection spool fluidly connected to the connection line, the injection spool includes a double block and bleed manifold, and a hanger, the hanger includes a dual seal stack, the hanger configured to support the chemical injection string and to isolate the wellbore from the surface. The system further includes the chemical injection string fluidly connected to the connection line through the injection spool and the hanger, the chemical injection string configured to deliver the amount of dosing chemical to the wellbore. The chemical injection string includes injection valves, the injection valves positioned at intervals along the chemical injection string, where the injection valves include check valves, and sensors, where at least one sensor is positioned adjacent to each injection valve, where the sensors are selected from the group consisting of pressure sensors, temperature sensors, and combinations of the same. The well livening system further includes a permanent downhole monitoring system (PDHMS) and a data acquisition system, the data acquisition system configured to collect downhole data, where the downhole data includes data from the sensors and the permanent downhole monitoring system and to transmit the downhole data to the controller system.

In certain aspects, the chemical injection string further includes thermal filaments, the thermal filaments positioned adjacent to each injection valve, the thermal filaments configured to increase a local temperature in the wellbore. In certain aspects, accumulation is selected from the group consisting of paraffin, heavy materials, emulsions, and combinations of the same. In certain aspects, the dosing chemical is selected from the group consisting of nonflammable solvents, chemical breakers, and combinations of the same. In certain aspects, the controller system uses logical programming to determine the amount of the dosing chemical based on the downhole data. In certain aspects, the double block and bleed manifold includes at least one block valve and at least one bleed valve, where the double block and bleed manifold is configured to block the chemical injection string and bleed the dosing chemical from the connection line. In certain aspects, the check valves of the injection valves include double check valves.

In a second aspect, a method for chemically livening a well in a reservoir is provided. The method includes the steps of collecting downhole data from sensors positioned on a chemical injection string suspended in a wellbore in a data acquisition system, transmitting downhole data from the data acquisition system to a controller system, analyzing the downhole data in the controller system to determine an amount of dosing chemical to be transferred to the wellbore when the downhole data indicate an accumulation in the wellbore, transmitting a signal from the controller system to a dosing pump to activate the dosing pump, the dosing pump fluidly connected to a chemical storage tank, operating the dosing pump to transfer the amount of dosing chemical from the chemical storage tank to the wellbore, transferring the amount of dosing chemical from the chemical storage tank to a hanger installed at a wellhead of the wellbore, injecting the amount of dosing chemical into the wellbore through a chemical injection string, opening one or more injection valves such that the amount of dosing chemical is introduced into the wellbore through the open injection valves, mixing the amount of dosing chemical with fluids in the wellbore, such that the dosing chemical interacts with the accumulation, and diluting the accumulation due to interaction between the accumulation and the dosing chemical, such that diluting the accumulation reduces the hydrostatic pressure in the wellbore causing formation fluids to flow from the reservoir.

In certain aspects, the method further includes the steps of operating thermal filaments, the thermal filaments positioned adjacent to each injection valve, the thermal filaments configured to increase a local temperature in the wellbore, and increasing the local temperature in the wellbore adjacent to each thermal filament. In certain aspects, the method further includes the step of implementing logical programming in the controller system to determine the amount of dosing chemical based on the downhole data.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
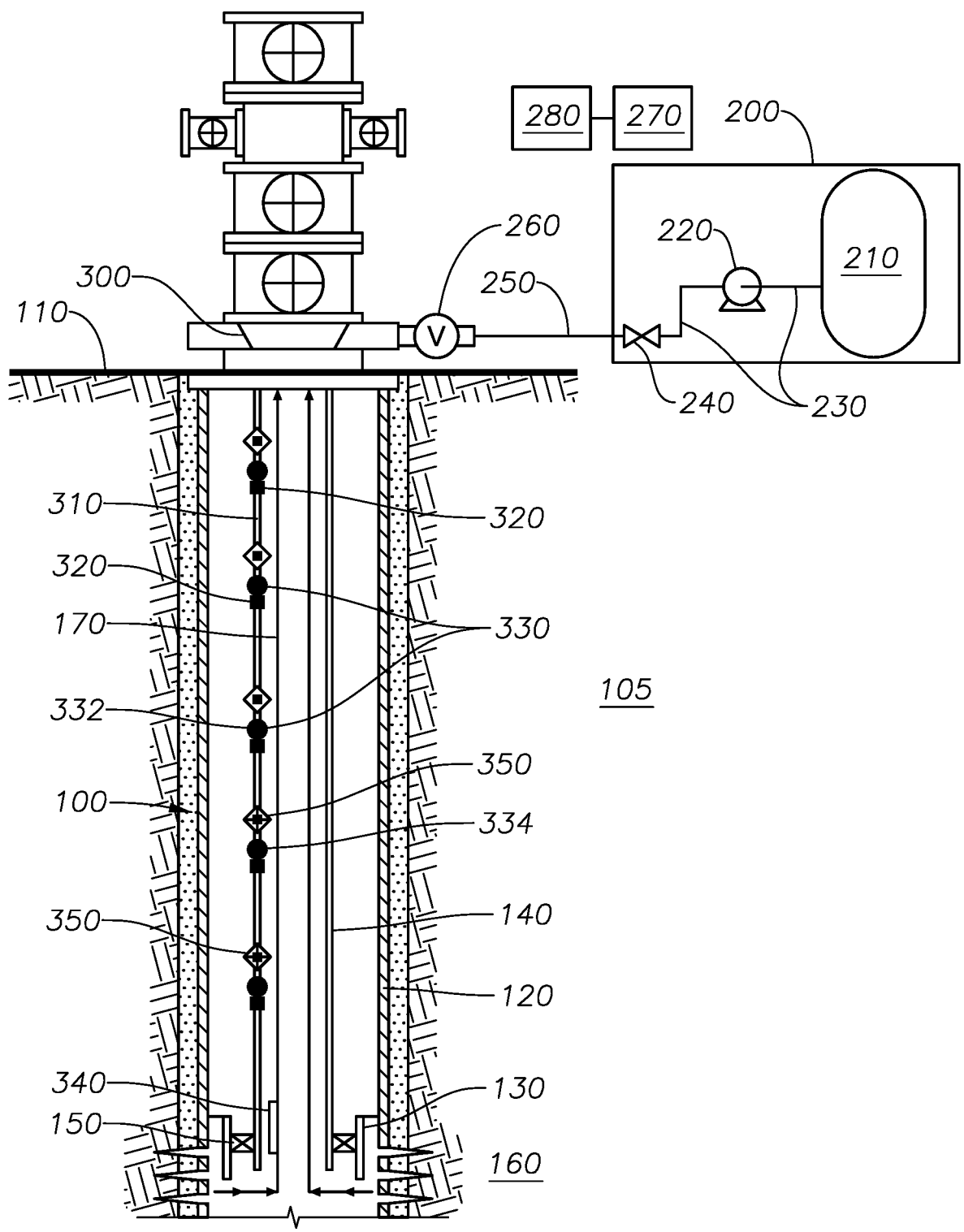
FIG. 1 is a schematic diagram of an embodiment of the well livening system.

In the figures, similar components or features, or both, can have the same or similar reference label.

DETAILED DESCRIPTION OF THE INVENTION

While methods and systems will be described with several embodiments, it is understood that one of ordinary skill in the relevant art will appreciate that many examples, variations and alterations to the systems and methods described here are within the scope and spirit of the embodiments. Accordingly, the embodiments described herein are set forth without any loss of generality, and without imposing limitations, on the embodiments.

The well livening methods and systems described reduce hydrostatic pressure gradients due to accumulations along a column of producing formation fluid from low reservoir pressure well. Achieving flow restoration in dead or dying production wells can occur through dilution and breaking of the accumulations, such as build-up or heavy oil gradient fluids.

Advantageously, the well livening system eliminates the need for expensive kick off operations using conventional intervention techniques. Advantageously, the well livening system is a cost effective means to unlock the potential of problematic wells unable to flow because of buildup of paraffins or other branched chain hydrocarbons in tubing, especially when higher production rates are required. Advantageously, with the well livening system ease of handling is possible using limited resources. Advantageously, the well livening system is simpler to use compared to well intervention methods. Advantageously, the well livening system helps to improve or increase data surveillance count because these wells can be available when required. Advantageously, integrating the dosing pump, or flow valve, with the controller system with logical programming allows automated injection of the dosing chemical as needed and allows for variation of the time between injections and the amount of dosing chemical and duration of injection. Advantageously, integrating the thermal filaments with the controller system with logical programming allows the system to use heat and the dosing chemical as needed to maximize efficiency of the system. Advantageously, the use of the data acquisition system and the controller system allows the well livening system to learn from past injection cycles in order to optimize future injections based, including the application of heat, the length of the injection, the rate of injection, the pressure of the injection, and the need for intermittent or continuous flow. Operating the well livening system based on downhole data allows each injection to tailored for the point in time needs in the wellbore. Advantageously, the well livening system can be used to address different types of accumulations. Advantageously, the use of the well livening system can be done without taking active steps to halt or cease production. Advantageously the systems and methods to chemical liven dead wells can be used during primary recovery operations. Advantageously, the systems and methods to chemically liven dead wells can both dilute fluids in the well and remove solid buildup. Advantageously, the systems and methods to chemically liven dead wells can operate in the absence of a shut-in time for the well and the dosing chemical can be applied while formation fluids are flowing. The absence of a required shut-in time can increase production and is due to the precision application of the dosing chemical through the injection valves with the sensors. Advantageously, the system includes subsurface equipment and sensors which allow for application of dosing chemical that is responsive to real time conditions in the wellbore. Advantageously, the systems and methods can be used when the formation fluid is a liquid.

As used throughout, "amount of dosing chemical" refers to the total volumetric quantity and the rate at which the quantity will be delivered, that is the injection rate. The injection rate at which the dosing chemical is administered can be optimized using downhole data, such that an optimization curve can be constructed for improving the economics of the system.

As used throughout, "downhole data" refers to any and all data transmitted by sensors or instruments in wellbore 100 to the surface.

As used throughout, "accumulation" refers to a build-up in the wellbore. The build-up can occur on tubulars or piping segments, on downhole equipment, or on the walls of wellbore 100 or a liner for a cased wellbore. The accumulation can include paraffins, heavy oil gradient fluids, emulsions, and combinations of the same.

As used throughout, "heavy oil gradient fluid" refers to a relatively heavy density, high molecular weight hydrocarbon fluid, typically with an API of 19° or less (a specific gravity of 0.9401 or greater or 0.407 psi/ft or greater), with considerable viscosity.

Generally, if $SG_{oil}$ is the specific gravity of oil, then $$SG_{oil} = \frac{141.5}{131.5 + API},$$

where API=19°

$$SG_{oil} = \frac{141.5}{131.5 + 19},$$

such that
$SG_{oil}$=0.9401 and as a result the oil gradient is 0.407 psi/ft (0.9401×0.433).

The buildup of the heavy oil gradient fluids in oil wells, often because of paraffin or emulsion, especially in the flow conduit of the tubing, significantly increases the hydrostatic pressure in tubing. Consequently, accumulation of the heavy oil gradient fluids leads to pressure losses available for vertical lift and thus, reduced well deliverability for a well under natural flow. With reservoir pressure decline, many wells under these conditions become sensitive to such hydrostatic pressure increase, exhibit uneventful or lackluster, such as unstable or erratic, performance and eventually cease to flow.

The system and method disclosed can help to sustain natural flow in wells by modifying prevailing conditions to alleviate unwarranted flow limitations.

A well livening system that can reduce accumulation in wellbore 100 is described with reference to FIG. 1.

Wellbore 100 is any wellbore that is operating such that formation fluids are being recovered. In at least one embodiment, wellbore 100 is a completed well that includes casing 120, liner 130, and tubing 140. Packers 150 isolate production zone 160 from the annulus between tubing 140 and casing 120, such that formation fluid 170 flows from formation 105 into tubing 140. Formation fluids 170 can be any fluids in formation 105. Formation fluids 170 can include crude oil, natural gas, formation water Chemical skid 200 is located at surface 110 adjacent to wellbore 100. Chemical skid 200 can be any type of chemical treatment unit that can be situated external to, but near a wellbore. In at least one embodiment, chemical skid can be a self-contained system sitting on a skid or pallet and containing the required process units, piping, and valving. In at least one embodiment, chemical skid 200 can be erected on site near wellbore 100. Chemical skid 200 includes chemical storage tank 210, dosing pump 220, skid line 230, and dosing check valve 240. Chemical skid 200 can include all required piping, valving, and instrumentation required such that chemical skid 200 operates as described and complies with all safety and environmental regulations.

Chemical storage tank 210 contains the dosing chemical. Chemical storage tank 210 can be any type of tank capable of containing the dosing chemical. Chemical storage tank 210 can be oriented vertically or horizontally. Chemical storage tank 210 can be sized based on the anticipated flow for the wellbore and the shelf-life of the dosing chemical. Chemical storage tank 210 can include instrumentation to monitor the interior and relief valves.

The dosing chemical can include any chemical capable of reducing the accumulation in wellbore 100, that is thermally stable at the conditions of wellbore 100, is compatible with production fluids, and can be introduced at the downhole pressure. The specific dosing chemical can depend in part on the nature of the accumulation. Samples of the accumulation can be collected using bailed wireline runs and the dosing chemical can be selected based on the sample of the accumulation. The specific dosing chemical can also be selected based on thermal stability and compatibility with wellbore 100. The specific dosing chemical be selected based on stability across the applicable temperature range of wellbore 100 to ensure effective treatment. The dosing chemical can operate to reduce the accumulation by reducing the viscosity of the accumulation or by reacting with the accumulation. The dosing chemical can include solvents, diluents, thinners, stabilizers, pour point depressants, de-emulsifiers, modifiers, drag reducers, viscosity reducers, reactants, and combinations of the same. Stabilizers and pour point depressants can be selected to control asphaltene and paraffin.

Dosing pump 220 is fluidly connected to chemical storage tank 210. Dosing pump 220 can be any type of metering pump capable of transferring an amount of the dosing chemical from chemical storage tank 210. Examples of metering pumps suitable for use as dosing pump 220 include piston pumps, diaphragm pumps, and positive displacement pumps. The specific type of metering pump selected as dosing pump 220 can depend on the dosing chemical, the flow rate of the dosing chemical, and the pressure in wellbore 100.

In an alternate embodiment, dosing pump 220 can be replaced with a flow valve that can be operated to allow for metered injection of the amount of dosing chemical. A flow valve can replace dosing pump 220 when the system and process require increased accuracy, precise control of the flow of the dosing chemical, or constant flow of the dosing chemical. A dosing pump can require change in flow rate due to response of the process pressure, pump efficiency, pump speed and piping configuration and inconsistency in flow can be experienced due to pulsating action of pump strokes. Advantageously, a flow valve can result in more regulated flow during a process upset due to fail open or fail closed modes of operation. Advantageously, flow valves can be less complex and less expensive, with minimal calibration and maintenance compared to a dosing pump. The operation of the flow valve can be controlled by controller system 270 based on the downhole data. The flow valve can allow for control over a greater range of the amount of dosing chemical. The flow valve would fluidly connect to chemical storage tank 210 and dosing check valve 240.

Skid line 230 can fluidly connect chemical storage tank 210, dosing pump 220, and connection line 250. Skid line 230 can be any type of piping capable of transporting the dosing chemical through chemical skid 200. Examples of skid line 230 can include piping, tubing, flexible hose, and combinations of the same.

Dosing check valve 240 is positioned on skid line 230 downstream of dosing pump 220. Dosing check valve 240 can be any type of check valve to allow flow of the dosing chemical from dosing pump 220.

Dosing pump 220 can produce dosing stream 10. The pressure of dosing stream 10 can depend on the pressure in wellbore 100. The flow rate of dosing stream 10 can depend on the amount of dosing chemical to be delivered to wellbore 100.

Connection line 250 can fluidly connect chemical skid 200 to injection spool 260. Connection line 250 can be any type of piping capable of connecting two process units and capable of transporting the dosing chemical. Examples of piping suitable for use of connection line 250 include piping, tubing, flexible hose, and combinations of the same. The size of connection line 250 can be based on the amount of the dosing chemical to be injected into wellbore 100.

Injection spool 260 is fluidly connected to connection line 250. Injection spool 260 can ensure a good pressure seal at the wellbore. Injection spool 260 can include a double block and bleed manifold. The use of a double block and bleed manifold can ensure a good pressure seal of injection spool 260. The double block and bleed manifold includes at least one block valve and at least one bleed valve. The at least one block valve isolates the fluids in wellbore 100 and prevents the fluids from flowing out of wellbore 100. The at least one bleed valve bleeds fluids upstream of injection spool 260. The double block and bleed manifold enables the subsurface system to be separated from the chemical skid and surface system for maintenance or other work without removing the system in the wellbore. The size of injection spool 260 can be based on the pipe diameter of connection line 250 and the amount of dosing chemical to be injected into wellbore 100.

Controller system 270 is situated on surface 110. Controller system can be any type of controller and logic system capable of providing process automation to the well livening system. Controller system 270 can be electrically connected to chemical skid 200 to control the operation of chemical skid 200 including dosing pump 220 and dosing check valve 240. In at least one embodiment, controller system 270 can be programmed to operate automatically and can control chemical injection skid 200 in an adaptive way to maintain the desired conditions in wellbore 10. Controller system 270 can receive downhole data from data acquisition system 280. Logical programming of controller system 270 can determine the amount of the dosing chemical to transfer from chemical storage tank 210 to wellbore 100 based on the downhole data. Controller system 270 is electrically connected to dosing pump 220 such that controller system 270 sends signals to operate dosing pump 220 causing the dosing chemical to flow through connection line 250. The length of time dosing pump 220 operates can be based on the amount of dosing chemical required as determined by controller system 270.

Data acquisition system 280 can be any type of unit capable of receiving data from instruments positioned in wellbore 100. Data acquisition system 280 can collect the downhole data from instruments in wellbore 100 and transmit the downhole data to controller system 270.

The downhole data includes data about the accumulation that can be used by the logical programming in controller system 270 to determine the amount of dosing chemical.

Controller system 270 can operate chemical skid 200 continuously or intermittently. Whether chemical skid operates continuously or intermittently depends on the conditions in wellbore 100. Intermittent operation can occur at regular intervals or can occur on an as needed basis based on conditions in wellbore 100.

Controller system 270 and data acquisition system 280 can work to avoid under diluted wells, wells that have too little dosing chemical and therefore no impact on the hydrostatic pressure, and over diluted wells, wells that have more dosing chemical than needed which results in loss of dosing chemical and increased costs.

In at least one embodiment, filters can be included in skid line 230, connection line 250, and combinations of the same. The filters can filter impurities or other solids from the dosing chemical.

Hanger 300 can be installed at the wellhead of wellbore 100 as part of the recovery operations. Hanger 300 can serve in multiple aspects of the recovery operations not only the well livening system. Hanger 300 includes a dual seal stack. Hanger 300 can isolate wellbore 100 from the conditions of surface 110 and can support chemical injection string 310. Hanger 300 can include a dual seal stack and can ensure the injection port is straddled and confined, such that subsurface components are isolated from the surface components.

Chemical injection string 310 sits in wellbore 100 and is fluidly connected to connection line 250 through injection spool 260 and hanger 300. Chemical injection string 310 can be any type of piping capable of delivering a fluid to a wellbore. Examples of chemical injection string 310 can include piping, tubing, the amount of dosing chemical to wellbore 100. Chemical injection stream 310 is suspended in wellbore 100. Chemical injection string 310 can be suspended anywhere within wellbore 100. In at least one embodiment, chemical injection string 310 can be suspended proximate to tubing 140. The length and diameter of chemical injection string 310 can depend on the depth of the well, the pressure within wellbore 100 and the pressure of the formation. Chemical injection string 310 includes injection valves 320 and sensors 330. Chemical injection string 310 can be installed before completion of wellbore 100 or after completion of wellbore 100.

Injection valves 320 can be positioned at intervals along chemical injection string 310. The injection valves can be any type of injection point capable of releasing a fluid from the injection string. The spacing of injection valves 320 along chemical injection string 310 can be based on the length of chemical injection string 310, the diameter, the nature of the accumulation, including build-up and the gradient of the fluids in wellbore 100. In addition, the productivity index of the well can govern the spacing of injection valves 320 and the positions of thermal filaments 350. In embodiments of the well livening system where chemical injection string 310 is installed after completion and after recovery operations begin, pressure and temperature monitoring of conditions in wellbore 100 can be used to determine the spacing of injection valves 320 and the positions of thermal filaments 350. Spacing of injection valves 320 can also depend on the gradient of the fluids in the tubing, the gradient of the dosing chemical and the presence of a multiphase fluid gradient. In at least one embodiment, at least one injection valve 320 is installed proximate to packer 150. In at least one embodiment, at least one injection valve 320 is installed within 1900 feet (580) meters from the surface. In at least one embodiment, the depth at which each injection valve 320 is installed is determined by the downhole data.

The injection valves 320 comprise check valves. The check valves can be any type of check valve where the opening pressure is not dependent on the temperature or pressure of the wellbore. Advantageously, using valves that are independent of wellbore temperature and pressure can reduce valve chatter and allows the injection valves to be deployed at any depth. In at least on embodiment, the check valves are double check valves. Each injection valve 320 can be individually controlled, such that one or more injection valves 320 can be opened at any time to allow for flow of the dosing chemical into the wellbore. Advantageously, individually controlling the opening of each injection valve 320 allows for targeted application of the dosing chemical. Such targeted application could include application of dosing chemical at multiple depths of wellbore 100 simultaneously or different depths in successive stages in wellbore 100. The configuration of injection valves 320 open can be determined based on conditions in the wellbore collected from sensors 330 and PDHMS 340.

Sensors 330 can be positioned proximate to each injection valve 320. In at least one embodiment, sensors 330 can be positioned adjacent to each injection valve 320. The sensors can include pressure sensors 332, temperature sensors 334, and combinations of the same. Pressure sensors 332 can be any type of instrument capable of measuring pressure. Temperature sensors 334 can be any type of instrument capable of measure temperature. Sensors 330 can be electrically connected to data acquisition system 280 such that the measurements made by the sensors can be transmitted to the data acquisition system 280. The measurements by pressure sensor 332 and temperature sensor 334 form part of the downhole data. Locating sensors 330 proximate to injection valves 320 allows for data collection at the point where the dosing chemical interacts with the accumulation.

Permanent downhole monitoring system (PDHMS) 340 can be any type of permanently installed downhole monitoring system capable of measuring pressures (formation and tubing), fluid density, temperatures (including distributive temperature), flow rates, and time. PDHMS 340 transmits data to data acquisition system 280. Advantageously, the systems and methods for well livening can use data from a PDHMS installed for production. Incorporating data from PDHMS 340 into the downhole data collected by data acquisition system 280 provides real-time reservoir data, such as reservoir pressure and flow rate of formation fluids 170, which in turn enables responsive operation of the well livening system.

In at least one embodiment, chemical injection string 310 further includes thermal filaments 350. Thermal filaments 350 can be any type of heating element which can generate heat and increase the localized temperature. Increasing the localized temperature in wellbore 100 can reduce the viscosity and the density of the fluids and improve the effectiveness of the dosing chemical. In at least one embodiment, the accumulation can include buildup of highly viscous fluids along the tubing and the heat generated from thermal filaments 350 reduce the viscosity cause the highly viscous fluids to flow. Thermal filaments 350 can be designed and positioned such that the heat does not affect the integrity of the tubulars, the casing, or any downhole equipment. The downhole data can be used in the controller system 270 to determine when heat should be applied. Controller system 270 can be electrically connected to thermal filaments 350, such that controller system 270 can turn on and off thermal filaments 350 as needed to increase the temperature.

In at least one embodiment of the well livening system, thermal filaments 350 can be positioned adjacent to the lower depth side of each pressure sensor 332.

Figure 2:
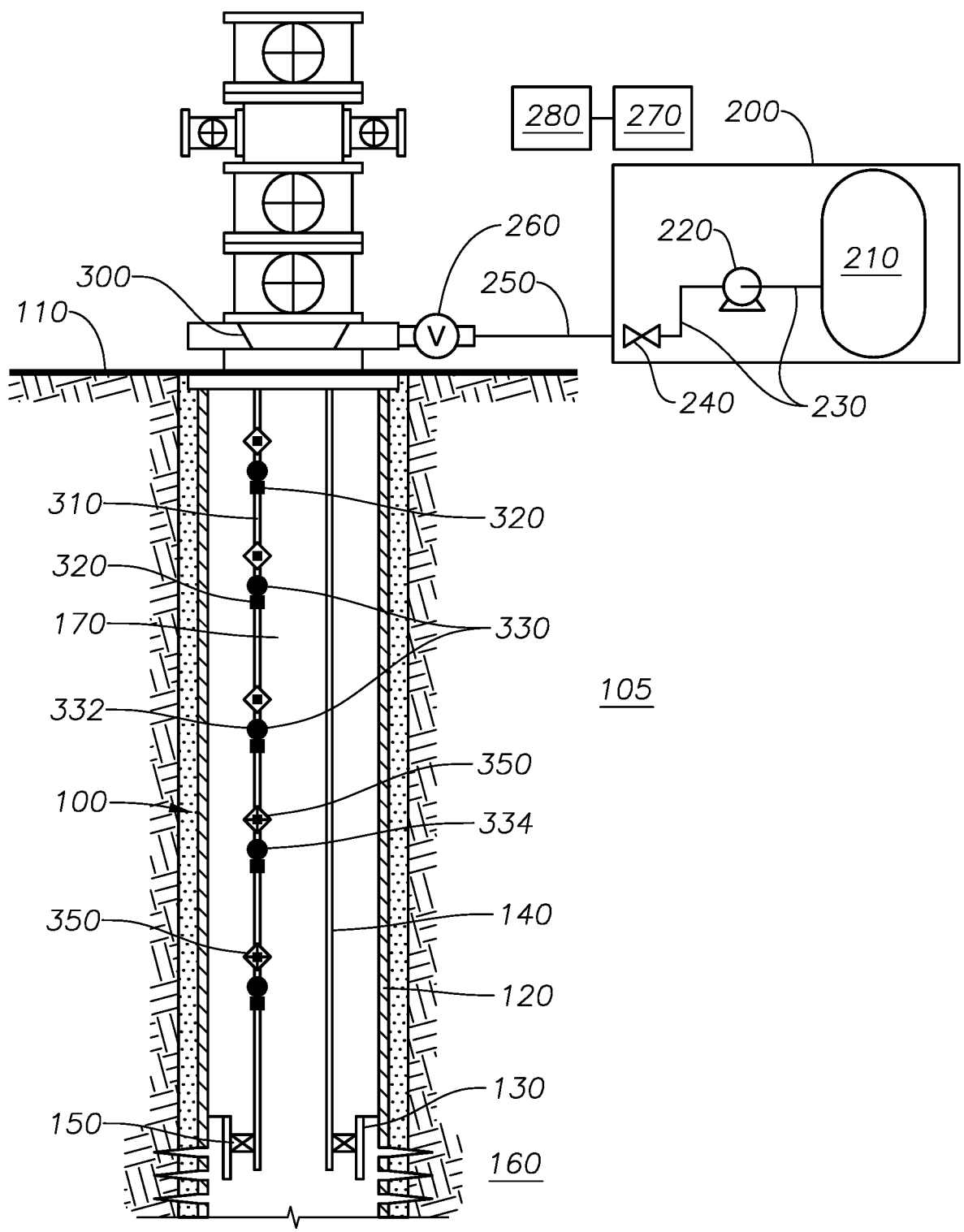
FIG. 2 is schematic diagram of an embodiment of the well livening system.

A method using the well livening system is also described with reference to FIG. 2. Sensors 330 transmit downhole data from wellbore 100 during recovery operations, including pressure data. Data acquisition system 280 transmits the downhole data to controller system 270. Logical programming in controller system 270 analyzes the data to monitor the functioning and flow in wellbore 100. When the flow of formation fluids 170 ceases, or when the downhole data suggest that the flow of formation fluids 170 is reduced, data controller 270 can turn on dosing pump 220. The dosing chemical flows from chemical storage tank 210 through skid line 230 and dosing check valve 240. The length of time for which dosing pump 220 pumps the dosing chemical depends on the amount of the dosing chemical determined by controller system 270.

The amount of dosing chemical flows through injection spool 260 and hanger 300 into chemical injection string 310. The amount of dosing chemical flows through injection valves 320 and into wellbore 100. If the injection pressure of the amount of dosing chemical is greater than the pressure in wellbore 100, then the dosing chemical can be injected to a point proximate to packer 150 in a single step to dilute the accumulations in tubing 140 to a point right above the packer. Otherwise, injection of the dosing chemical through the shallower injection valves 320 can dilute the accumulations in wellbore 100 in stages.

As the dosing chemical flows into wellbore 100, the dosing chemical can interact with the accumulations in tubing 140. Where the accumulations are fluids, the dosing chemical can mix with the fluid accumulations in tubing 140 and the density and viscosity of the fluid accumulation in tubing 140 can be reduced. Mixing the dosing chemical with the fluid accumulations in tubing 140 can result in a reduction in the flowing bottom hole pressure and an effective drawdown increase as the solubility of chemicals in the oil increases. Where the accumulations are buildup, the dosing chemical can interact with the accumulation causing the accumulation to be diluted or to break apart. The introduction of the dosing chemical can result in oil thinning. The solubility of the dosing chemical in the fluids in wellbore 100 can increase as the hydrostatic head drops at increasing injection depth. The introduction of the dosing chemical can result in a change in flow pattern in tubing 140 to one with more mixing and decreased liquid holdup. Utilizing the dosing chemical to dilute the accumulation in tubing 140 has the effect of lightening the hydrostatic pressure head and enabling the formation fluids to flow against the trunk line pressure as the reservoir pressure becomes sufficient to drive the formation fluids through tubing 140 and to the surface 110.

In at least one embodiment with thermal filaments 350 installed on chemical injection string 310, controller system 270 can turn on thermal filaments 350 causing an increase in temperature. Thermal filaments 350 can be operated before the amount of dosing chemical is injected, after the amount of dosing chemical is injected, during the step of injecting the amount of dosing chemical, or a combination of the same. The heat further reduces the fluid viscosity and increases mixture velocity. The heat can increase the temperature of the accumulations reducing the hydrostatic head in tubing 140 such that vertical lift performance from the reservoir pressure is improved. In at least one embodiment, the heat produced by thermal filaments 350 can supplement the dosing chemical to reduce accumulations such that the heat and the dosing chemical have an additive effect. In at least one embodiment, the heat produced by thermal filaments 350 can act on the accumulations separately from the dosing chemical to reduce the accumulations.

Returning to FIG. 1, after the accumulations are reduced, formation fluids 170 begin to flow again.

Advantageously, the well livening system can reduce bottomhole pressure and result in vertical lift improvement of the formation fluids.

The well livening system and method of use are in the absence of a test barge, nitrogen lift, or coiled tubing lift.

The well livening system and method can be deployed in one or more wellbores through data acquisition system 280. Data acquisition system 280 can collect data from a plurality of wells, where each well has its own chemical skid 200, controller system 270, and chemical injection string 310, along with hanger 300 and injection spool 260. Data acquisition system 280 can be used by field operators and engineers to monitor a field of wells and deploy the chemical well livening system as needed to maintain flow of formation fluids throughout the field.

EXAMPLE

Figure 4:
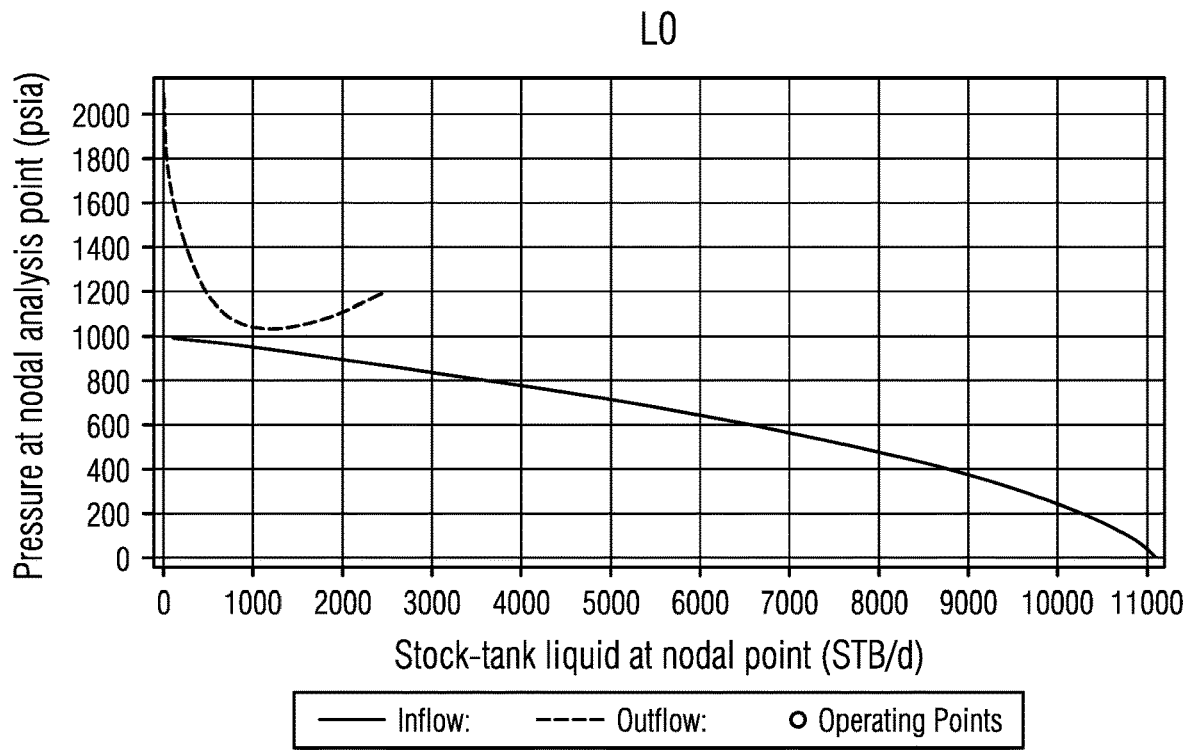
FIG. 4 is a graph showing the results from the Example case with no injection of dosing chemical.

Example. The Example was a simulated model using physics correlation software that models pressure drop, the PIPESIM software provided by Schlumberger having headquarters in Houston, Tex., USA. FIG. 4 is a diagrammatic representation of the model. "Slip" refers to the difference in gas velocity and liquid velocity during the flow of a multiphase fluid. The NoSlip correlation was adequate for examining the effect of the dosing chemical at the point of injection. The NoSlip correlation assumes homogeneous flow with no slip between the phases, because of the effect of the dosing chemical and/or heat application. A reasonable assumption of no slip is that fluid properties are the average of the gas and liquid phases:

$$\rho_{ns} = \lambda_L \rho_L + \lambda_G \rho_G \quad \text{Reaction (1)}$$

where $\lambda_L$ is the flowing fraction of the liquid phase (dimensionless); $\rho_L$ is the density of the liquid phase (Lb/ft$^3$); $\lambda_G$ is the flowing fraction of the gas phase (dimensionless); and $\rho_G$ is the density of the gas phase (Lb/ft$^3$).

Fluid property input data items in the nodal analysis model include gas-oil ratio and API gravity of the oil. The model was useful for investigating various injection depths of the dosing chemical and the effects on production rate of the formation fluid due to chemical injection. Generally, reservoir pressure decline, rise in water cut and introducing additional wells in the production system may necessitate the use of more dosing chemical on a field-wide basis. The extent of viscosity increase may influence the amount of heat use. Inflow input items include the reservoir pressure and productivity index, whereas outflow items include wellbore deviation, tubing size, and fluid properties.

Figure 3:
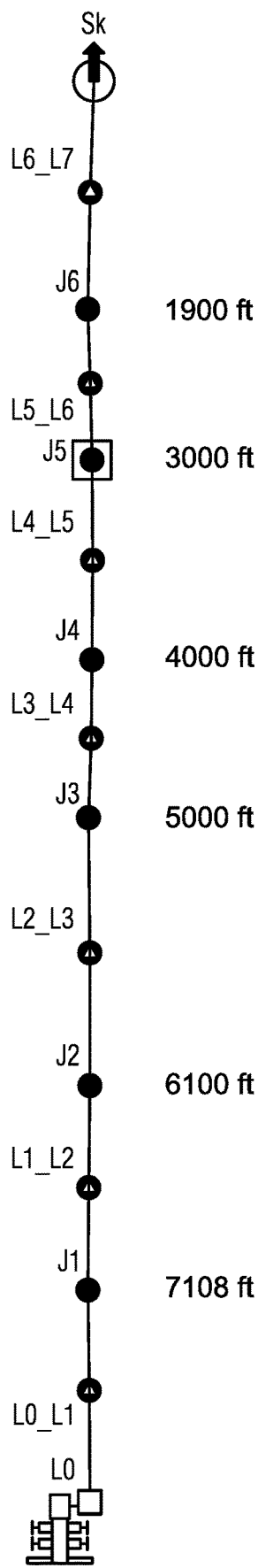
FIG. 3 is a schematic of the simulation model of the Example.

The model was set-up with a well, L0, and six injection points, labeled as J1, J2, J3, J4, J5, and J6 on FIG. 4. The formation fluids flow toward a sink, $S_K$, the surface. For convenience, the positions of the injection points are as in various depths along the chemical injection string, modeled as seven tubular conduits, labeled as pipelines L0-L1; L1-L2; L2-L3; L3-L4; L4-L5; L5-L6 and L6-L7 on FIG. 3.

Case 1. Case 1 was modeled without injection of the dosing chemical. Using the default correlations in PIPESIM, the OLGAS 2017.1 3 Phase correlation for horizontal flow and vertical flow, and a reservoir pressure of 1,000 psia (inlet pressure in the simulation), the nodal analysis shows no oil production, as the inflow performance and vertical lift performance curves do not intersect, as shown in FIG. 4. Inflow performance is the modeled flow from the reservoir into the well. The model accounts for the different parameters necessary to determine the flow including rock and fluid properties, saturations, compressibility, formation damage or stimulation, turbulence, and drive mechanism.

Figure 5:
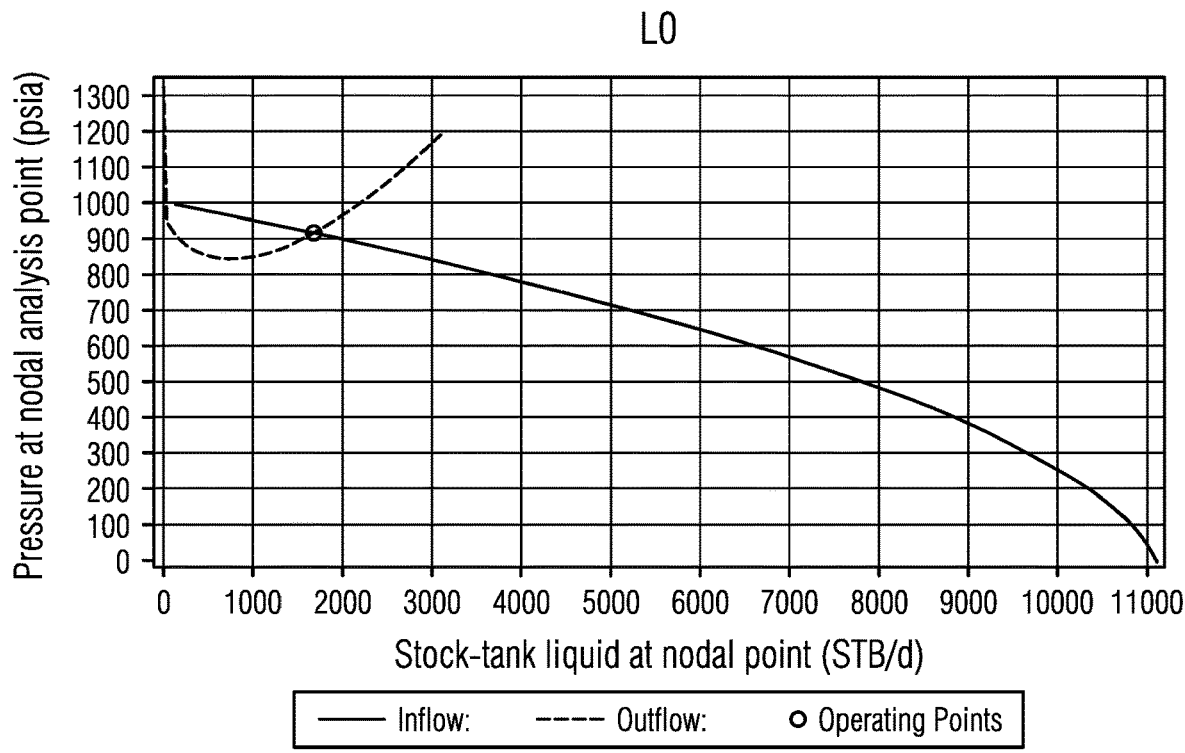
FIG. 5 is a graph showing the results from the Example case with injection of dosing chemical at the shallowest injection point.

Case 2. Case 2 was modeled with the dosing chemical being introduced through J6, the injection valve closest to the sink and a reservoir pressure of 1,000 psia (inlet pressure in the simulation). The phase correlations for horizontal flow and vertical flow for pipeline segments L5-L6 and L6-L7 were modeled as NoSlip. Solving for the same conditions as in Case 1, but activating the NoSlip correlation to mimic injection of the dosing chemical from J6 yields a flow rate of 1,674 barrels (bbls) as shown in FIG. 5.

Figure 6:
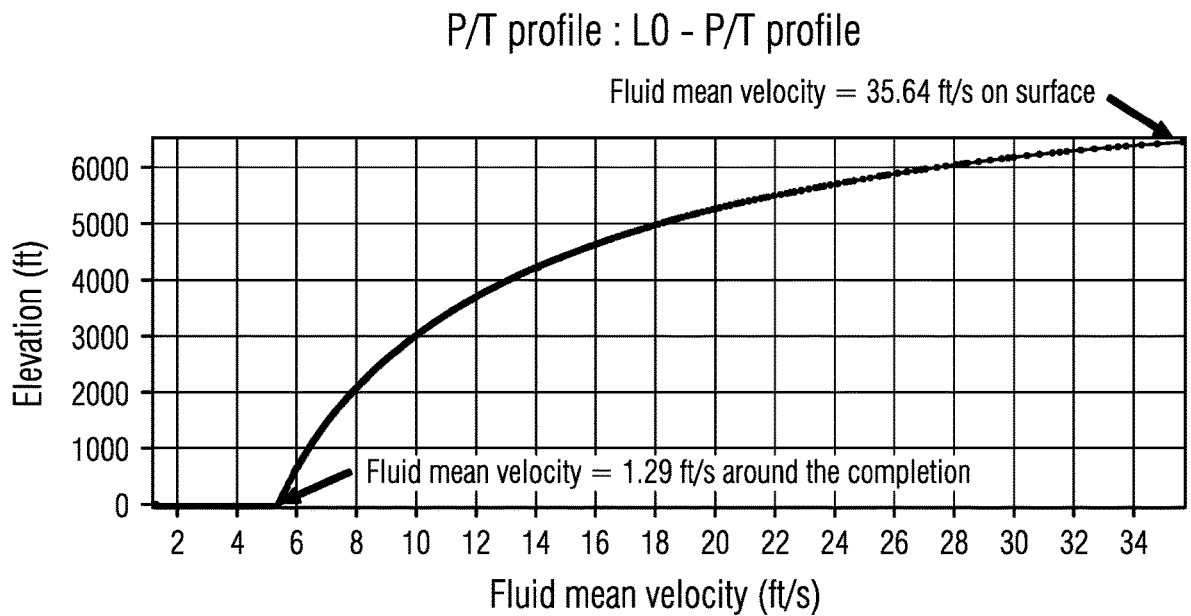
FIG. 6 is a graph showing the difference between fluid velocity at the packers and the surface.
Figure 7:
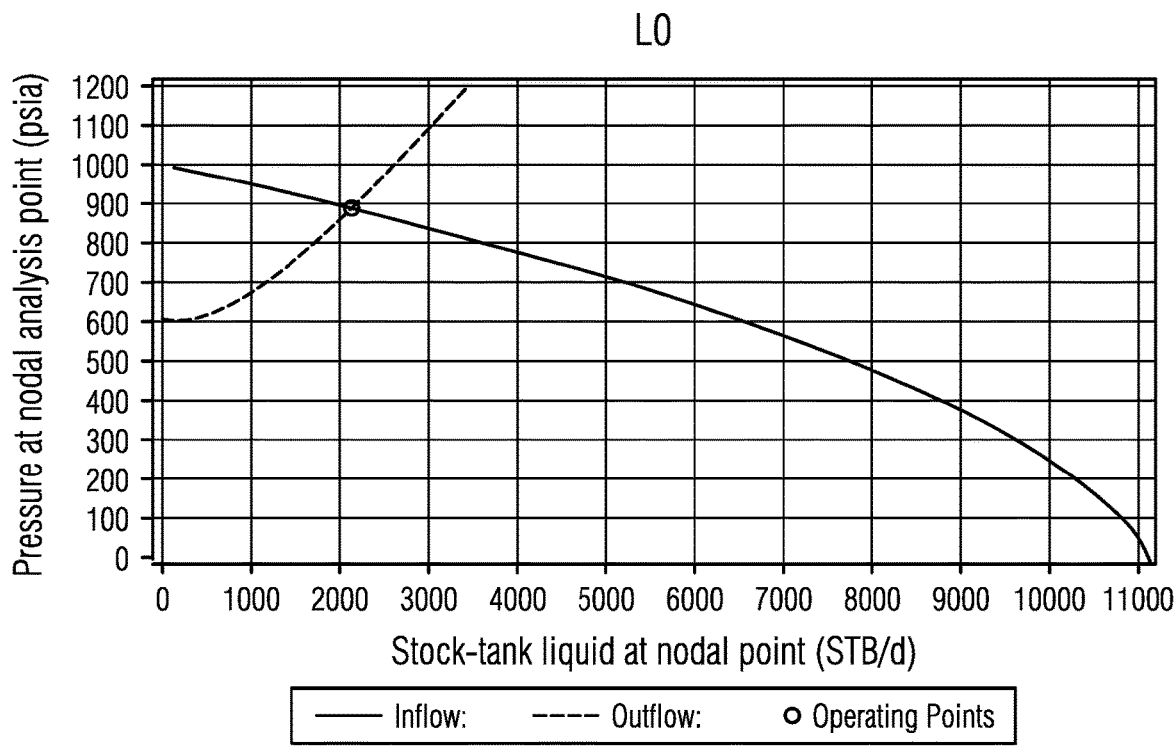
FIG. 7 is a graph showing the results from the Example case with injection of dosing chemical at the deepest injection point.

Case 3. Case 3 was modeled to investigate the effects of injection depth on a typical Arabian (medium) oil production response. The well was modeled with oil having an API gravity 19° API, an oil density of 56 Lb/ft$^3$, and an oil viscosity of 11.9 cP. Injection of the dosing chemical resulted in significant improvement of fluid mean velocity from 1.29 ft/s above the completion point to 35.6 ft/s at the surface, as shown in FIG. 6. Nodal analysis for the deepest chemical injection point, J1, shows more stable and improved flow as in FIG. 7.

Figure 8:
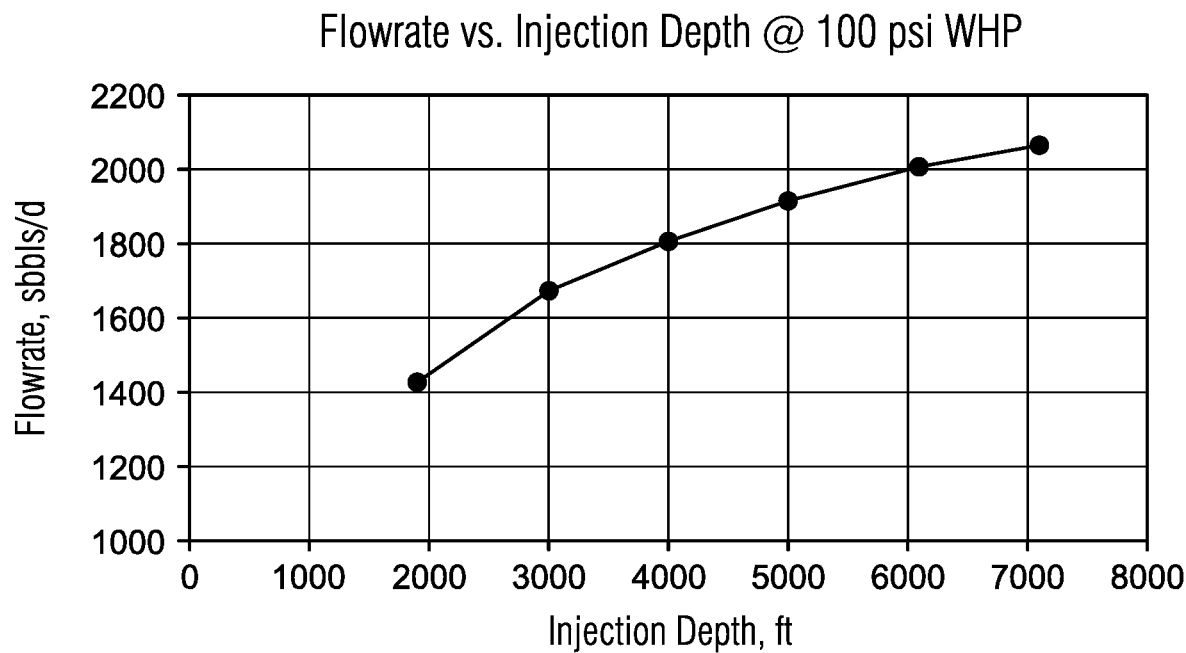
FIG. 8 is a graph of flow rate versus injection depth from the Example.

Additionally, the effects of injection depth of the dosing chemical on oil production flow rate, wellhead pressure and bottom hole pressure were investigated. The model showed that as the depth of injection increased, the oil production flow rate increased. Injecting the dosing chemical deeper for any given rate results in increased reduction in the flowing gradient and translates to a more efficient process as shown in Table 1. The flowrate versus injection depth at 100 psi wellhead pressure (WHP) is shown in FIG. 8.

TABLE 1

| Flowrate at injection depth | |
|---|---|
| Flowrate, sbbl/d | Depth, ft |
| 2069 | 7108 |
| 2013 | 6100 |
| 1920 | 5000 |
| 1807.2 | 4000 |
| 1674 | 3000 |
| 1427.8 | 1900 |

Figure 9:
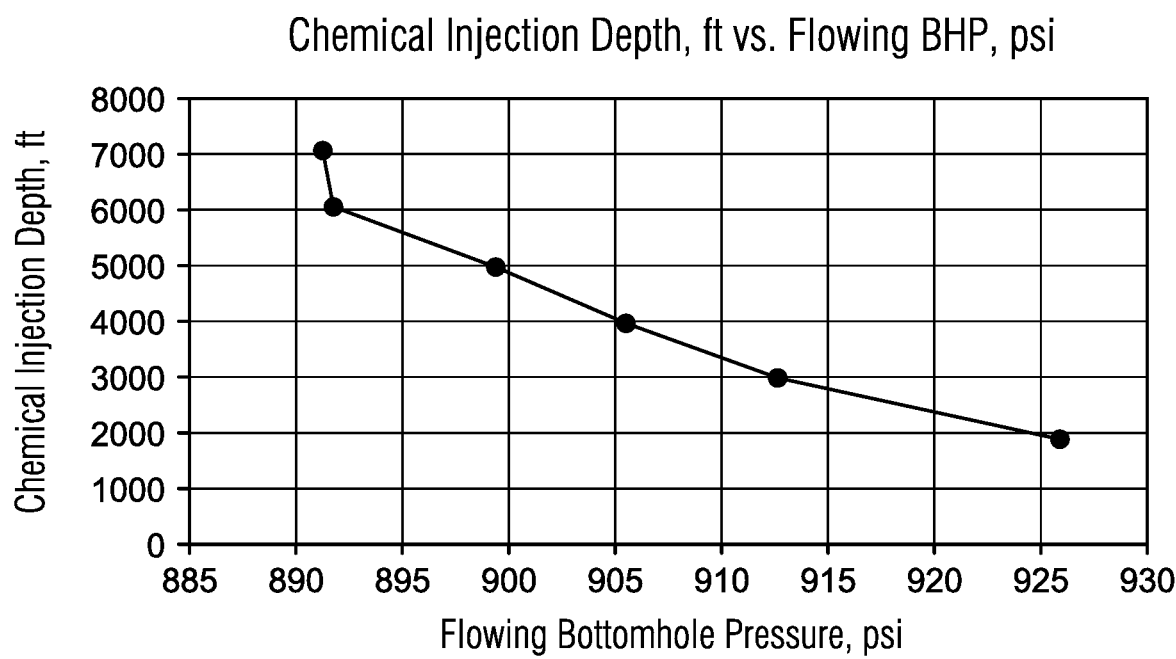
FIG. 9 is a graph of chemical injection depth versus flowing bottomhole pressure from the Example.

The model showed that for any given injection pressure, as injection depth of the dosing chemical increases, the flowing bottom hole pressure (FBHP) decreases. At deeper injection depths, increased amount of dosing chemical would be required, causing increased density reduction of the mixture in the wellbore than at shallower injection depths as shown in Table 2. The chemical injection depth versus flowing bottom hole pressure is shown in FIG. 9.

TABLE 2

| Flowing bottom hole dependency on injection depth | |
|---|---|
| FBHP, psi | Depth, ft |
| 891.3 | 7108 |
| 891.8 | 6100 |
| 899.5 | 5000 |
| 905.7 | 4000 |
| 912.9 | 3000 |
| 926.2 | 1900 |

Figure 10:
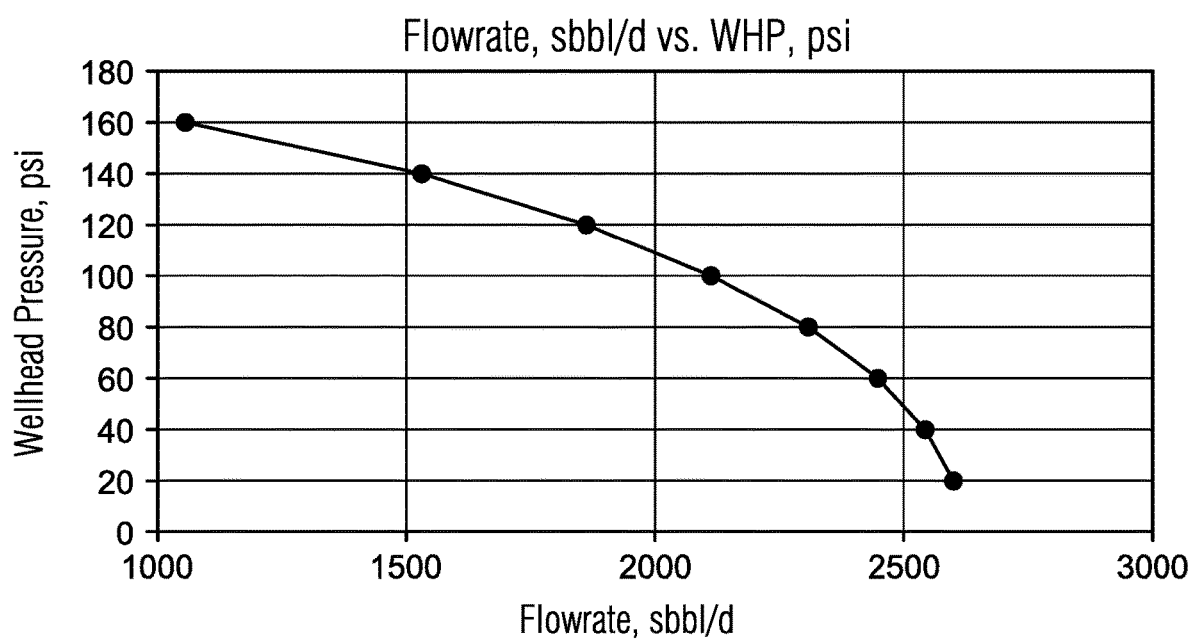
FIG. 10 is a graph of wellhead pressure versus the flow rate.

The model showed that wellhead pressure declines as the FBHP increases, as shown in FIG. 10. However, the drop in FBHP was relatively smaller than the drop in wellhead pressure because the increased flow velocity, mass flow rate, and mean specific volume can lead to a rise in the total flowing energy loss and therefore the average flowing pressure gradient. Reducing unnecessary restrictions by reducing the wellhead pressure could result in increased production from injection of the dosing chemical.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

What is claimed is:

1. A well livening system to reduce accumulation in a wellbore, the system comprising:
   a chemical skid, the chemical skid located at a surface adjacent to the wellbore, the chemical skid comprising:
     a chemical storage tank, the chemical storage tank configured to contain the dosing chemical,
     a dosing pump, the dosing pump fluidly connected to the chemical storage tank, the dosing pump configured to transfer an amount of dosing chemical from the chemical storage tank to a wellbore,
     a skid line, the skid line fluidly connecting the chemical storage tank, the dosing pump and a connection line, and
     a dosing check valve positioned on the skid line, the dosing check valve configured to allow flow of the amount of dosing chemical;
   a controller system, the controller system configured to determine the amount of dosing chemical to be transferred to the wellbore based on downhole data, the controller system electrically connected to the dosing check valve such that the controller system sends signals to open and close the dosing check valve based on the amount of dosing chemical;
   the connection line, the connection line fluidly connected to the dosing check valve of the chemical skid, the connection line configured to transport the amount of dosing chemical from the chemical skid;
   an injection spool, the injection spool fluidly connected to the connection line, the injection spool comprising a double block and bleed manifold;
   a hanger, the hanger comprising a dual seal stack, the hanger configured to support the chemical injection string and to isolate the wellbore from the surface;
   the chemical injection string, the chemical injection string fluidly connected to the connection line through the injection spool and the hanger, the chemical injection string configured to deliver the amount of dosing chemical to the wellbore, the chemical injection string comprising:
     injection valves, the injection valves positioned at intervals along the chemical injection string, wherein the injection valves comprise check valves,
     sensors, wherein at least one sensor is positioned adjacent to each injection valve, wherein the sensors are selected from the group consisting of pressure sensors, temperature sensors, and combinations of the same, and
     thermal filaments, the thermal filaments positioned adjacent to each injection valve, the thermal filaments configured to increase a local temperature in the wellbore, where the increase in local temperature increases the temperature of the accumulation reducing the hydrostatic head in a tubing in the wellbore such that vertical lift performance from the reservoir pressure is improved;
   a permanent downhole monitoring system (PDHMS), wherein the PDHMS is positioned proximate to a packer in the wellbore; and
   a data acquisition system, the data acquisition system configured to collect downhole data, where the downhole data comprises data from the sensors and the permanent downhole monitoring system and to transmit the downhole data to the controller system,
     wherein the accumulation is selected from the group consisting of paraffin, heavy materials, emulsions, and combinations of the same.

2. The system of claim 1, wherein the dosing chemical is selected from the group consisting of nonflammable solvents, chemical breakers, and combinations of the same.

3. The system of claim 1, wherein the controller system uses logical programming to determine the amount of dosing chemical based on the downhole data.

4. The system of claim 1, wherein the double block and bleed manifold comprises at least one block valve and at least one bleed valve, wherein the double block and bleed manifold is configured to block the chemical injection string and bleed the dosing chemical from the connection line.

5. The system of claim 1, wherein the check valves of the injection valves comprise double check valves.

6. A method for chemically livening a well in a reservoir, the method comprising the steps of:
   collecting downhole data from sensors positioned on a chemical injection string suspended in a wellbore in a data acquisition system;
   transmitting downhole data from the data acquisition system to a controller system, analyzing the downhole data in the controller system to determine an amount of dosing chemical to be transferred to the wellbore when the downhole data indicate an accumulation in the wellbore, wherein the accumulation is selected from the group consisting of paraffin, heavy materials, emulsions, and combinations of the same;
   transmitting a signal from the controller system to a dosing pump to activate the dosing pump, the dosing pump fluidly connected to a chemical storage tank;
   operating the dosing pump to transfer the amount of dosing chemical from the chemical storage tank to the wellbore;
   transferring the amount of dosing chemical from the chemical storage tank to a hanger installed at a wellhead of the wellbore;
   injecting the amount of dosing chemical into the wellbore through a chemical injection string, the chemical injection string comprising:
     injection valves, the injection valves positioned at intervals along the chemical injection string, wherein the injection valves comprise check valves, and
     the sensors, wherein at least one sensor is positioned adjacent to each injection valve, wherein the sensors are selected from the group consisting of pressure sensors, temperature sensors, and combinations of the same;

opening one or more injection valves such that the amount of dosing chemical is introduced into the wellbore through the open injection valves;

operating thermal filaments, the thermal filaments positioned adjacent to each injection valve, the thermal filaments configured to increase a local temperature in the wellbore;

increasing the local temperature in the wellbore adjacent to each thermal filament, where the increase in local temperature increases the temperature of the accumulation reducing the hydrostatic head in a tubing in the wellbore such that vertical lift performance from the reservoir pressure is improved;

mixing the amount of dosing chemical with fluids in the wellbore, such that the dosing chemical interacts with the accumulation; and diluting the accumulation due to interaction between the accumulation and the dosing chemical, such that diluting the accumulation reduces the hydrostatic pressure in the wellbore causing formation fluids to flow from the reservoir.

7. The method of claim 6, further comprising the step of implementing logical programming in the controller system to determine the amount of dosing chemical based on the downhole data.

8. The method of claim 6, wherein the dosing chemical is selected from the group consisting of nonflammable solvents, chemical breakers, and combinations of the same.

* * * * *